United States Patent [19]
Ohnishi

[11] Patent Number: 4,827,656
[45] Date of Patent: May 9, 1989

[54] LURE PLUG

[76] Inventor: Masaaki Ohnishi, 2-19, Hirano 2-chome, Adachi-ku, Tokyo, Japan

[21] Appl. No.: 69,489

[22] Filed: Jul. 2, 1987

[30] Foreign Application Priority Data

Mar. 16, 1987 [JP] Japan .................................. 62-60769

[51] Int. Cl.$^4$ ............................................. A01K 83/00
[52] U.S. Cl. .......................................... 43/34; 43/35
[58] Field of Search .......................... 43/34, 35, 36, 37

[56]  References Cited
   U.S. PATENT DOCUMENTS

| | | | |
|---|---|---|---|
| 2,277,553 | 3/1942 | Malmborg | 43/35 |
| 2,326,620 | 8/1943 | Charpenteer | 43/35 |
| 2,520,065 | 8/1950 | Rudy | 43/35 |
| 2,613,469 | 10/1952 | Haberkorn | 43/35 |
| 2,614,356 | 10/1952 | Kayes, Jr. | 43/35 |
| 2,794,286 | 6/1957 | Albach | 43/35 |
| 3,646,699 | 3/1972 | Ziman | 43/35 |
| 3,665,634 | 5/1972 | Baud | 43/35 |
| 4,562,661 | 1/1986 | Messinger et al. | 43/35 |

FOREIGN PATENT DOCUMENTS 25169  4/1909  France ..................... 43/35

Primary Examiner—Nicholas P. Godici
Assistant Examiner—Karen Skillman
Attorney, Agent, or Firm—Peter J. Georges

[57]  ABSTRACT

A lure plug for fishing including a plug body made of wood or plastics and having a slot extending in a longitudinal direction of the plug body, a hook rotatably secured to the plug body between a position within the slot and a position exposed out of the plug body, a resilient body provided in the slot such that the hook is biased into the position within the slot, and an operating member movably provided in the slot. When a fish bites the lure plug, the operating member pushes the hook out of the plug body against a resilient biasing force of the resilient body. When the fish discharges the lure plug, the hook is automatically returned into the position within the plug body, so that the lure plug is effectively prevented from being picked up by obstacles.

4 Claims, 5 Drawing Sheets

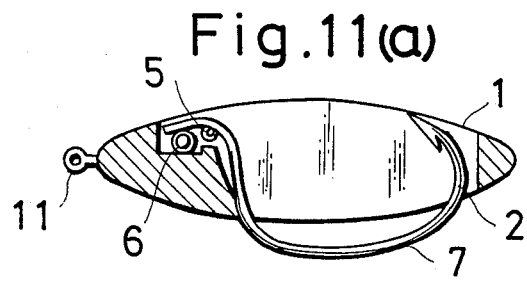
Fig.11(a)
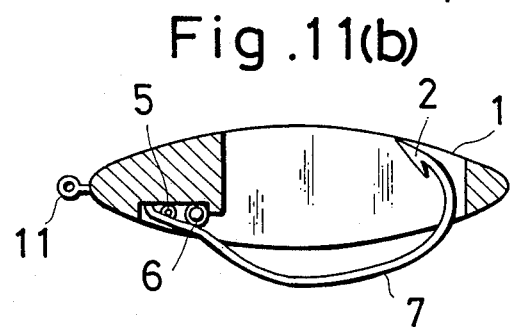
Fig.11(b)
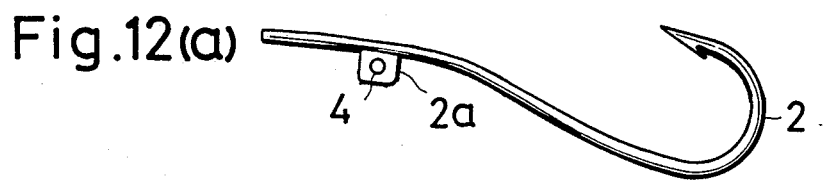
Fig.12(a)
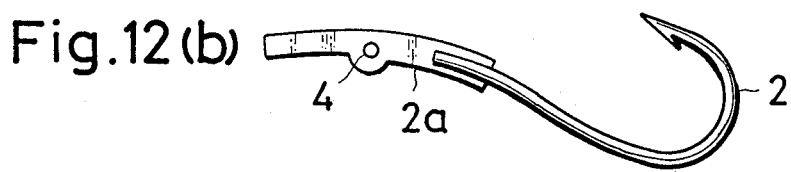
Fig.12(b)
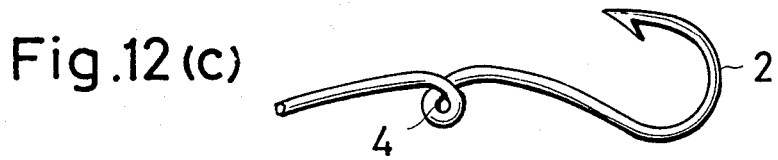
Fig.12(c)
Fig.13(a)   Fig.13(b)   Fig.13(c)

LURE PLUG

BACKGROUND OF THE INVENTION

Field of the Invention and Related Art Statement

The present invention relates to a lure plug comprising a plug body in the form of a fish and at least one hook which is movably secured to the plug body.

In ordinary known lure plugs, one or more hooks are hung from a plug body which is shaped as a small fish and the like. In such known lure plugs having hooks exposed out of the plug body, the hooks can hold up fishes at a high probability, but they have the problem that the hooks might be fastened to objects other than fishes.

As is well known, fishes have a habit that they lives near rocks, wood pieces and waterweeds and near the banks where glasses and bushes grow. When the known lure plugs having the exposed hooks are used in such hazardous places, the hooks are readily hold up by these obstacles and anglers lost much more lure plugs. Further if an angler fails the lure casting, the hooks might injure not only the angler per su, but also other persons around him. Moreover, the hooks of known plugs might be coupled with each other and it would be difficult to handle them.

In order to mitigate the above mentioned drawbacks of the known lure plugs there has been proposed another type of lure plug in which one or more hooks are installed within the plug body and when a fish bites the plug body and a tension force is applied to a line, the hooks are projected out of the plug body. However, in such a lure plug, when the plug body is arrested by obstacles and the angler pulls the line, the hooks might be projected out of the plug body and are liable to be picked up by hazards. Once the hooks have projected out of the plug body, they could not return into the position within the plug body unless the angler pushes the hooks within the plug body.

SUMMARY OF THE INVENTION

The present invention has for its object to provide a novel and useful lure plug in which one or more hooks are contained within the a plug body and when a fish bites the lure plug to produce a biting force, the hooks are projected out of the plug body, and when the biting force is disappeared, the hooks return automatically into a position within the plug body, so that the lure plug can be effectively prevented from being arrested by hazards and can be treated safely and easily.

According to the invention a lure plug comprises a plug body having a slot formed therein, said slot extending in a longitudinal direction of the plug body, a hook means inserted in said slot and rotatably secured to the plug body, an operating means movably provided in the plug body such that a portion of the operating means projects out of the plug body and pushes the hook means out of the plug body when a fish bites the lure plug, and a biasing means for biasing the hook means within the slot of the plug body.

DESCRIPTION OF THE DRAWINGS

FIGS. 4, 5, 6, 7, 8, 9, 10(a), 10(b) and 11(a), 11(b) are cross sectional views showing another embodiments of the lure plug according to the invention; and FIGS. 12(a), 12(b) and 12(c) and 13(a), 13(b) and 13(c) are side views illustrating several embodiments of the hook.

DESCRIPTION OF THE PREFERED EMBODIMENTS

Figure 1A:
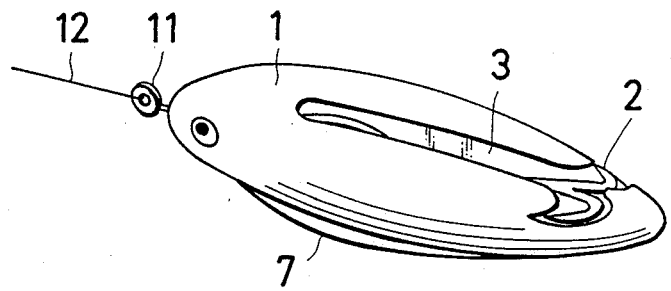
FIGS. 1(a), 1(b) and 1(c) are perspective, plan and cross sectional views, respectively showing a first embodiment of the lure plug according to the invention.
Figure 1B:
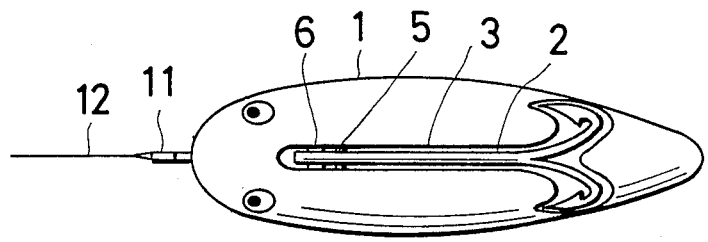
Figure 1C:
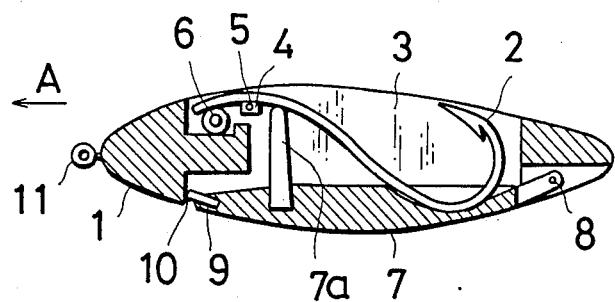

FIGS. 1(a), 1(b), and 1(c) are perspective, plan and cross sectional views, respectively showing a first embodiment of the lure plug according to the invention. The lure plug comprises a plug body 1 made of synthetic resin or wood and shaped in a small fish and a hook 2. In the plug body 1, there is formed a slot 3 in which the hook 2 is inserted. Near a root of the hook 2 there is provided a small plate having an a hole 4 formed therein and the hook is journalled by a shaft 5 which is secured to the plug body 1 and is passed through the hole 4. Therefore, the hook 2 can be rotated by a limited angle about the shaft 5. Between the plug body 1 and the root portion of the hook 2 is arranged a resilient body 6 made of a short rubber tube. The resilient body 6 serves to rotate the hook 2 in the clockwise direction in FIG. 1(c) so that the hook is biased into a position in which the hook 2 is hidden in the slot 3. Within the plug body 1, there is further formed a space communicating with the slot 3 in which space there is arranged an operating body 7 for pushing the hook 2 outwardly. The operating body 7 is journalled at its end by a supporting shaft 8 secured to the plug body 1. On an inner surface of the operating body 7 is secured an operating projection 7a.

In a free condition, the operating body 7 is pushed by the resilient body 6 via the hook 2 and the operating projection 7a to such an extent that the outer surface of the operating body 7 is slightly projected from the lower surface of the plug body 1. The rotational movement of the operating body 7 is restricted by a stopper pin 10 secured to a free end of the operating body 7 and a stopper portion 10 formed on the plug body 1. On a top of the plug body 1 there is provided a ring 11 for securing a line thereto.

Figure 2A:
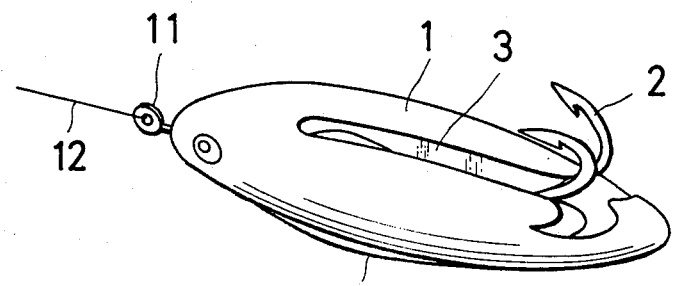
FIGS. 2(a) and 2(b) are perspective and cross sectional views, respectively illustrating the operating condition of the first embodiment of the lure plug.
Figure 2B:
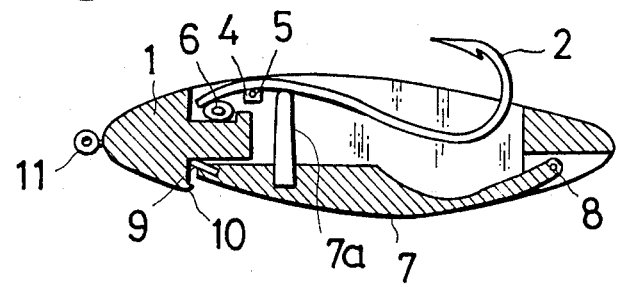

As illustrated in FIGS. 2(a) and 2(b), when a fish bites the lure plug, the operating body 7 is rotated slightly into the plug body 1 against the resilient force of the resilient body 6, so that the hook 2 is pushed by the operating projection 7a outwardly and the sharp curved free ends of the hook are projected out of the plug body 1.

In the first embodiment, the operating body 1 is made of synthetic resin or wood and constitutes a part of the plug body 1. That is to say, the plug body 1 and operating body 7 are coupled with each other to form a linear shape like a small fish. The hook 2 is hidden within the linear plug body. Therefore, even if the lure plug is pulled in a direction A in FIG. 1(c), the hook 2 is hardly picked up by the obstacles. Further a whole configuration is similar to the known lure plug and can be easily bitten by fishes.

When a fish bites the lure plug, the hook 2 is projected out of the plug body 1 owing to the biting force of the fish and is picked up by a mouth of the fish. Even if the fish discharges the lure plug from the mouth, the hook 2 and operating body 7 are automatically returned into the initial positions due to the resilience of the resilient body 6.

Figure 3A:
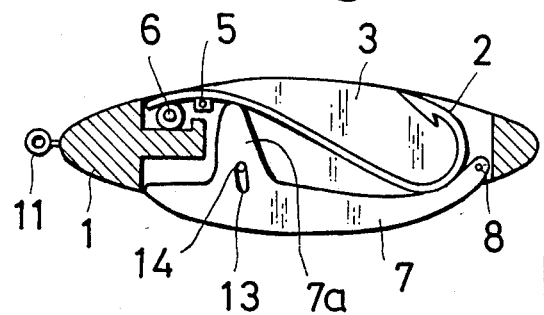
FIGS. 3(a) and 3(b) are cross sectional and side views, respectively depicting a second embodiment of the lure plug according to the invention.
Figure 3B:
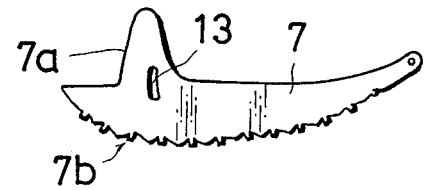

FIG. 3(a) is a cross section illustrating another embodiment of the lure plug according to the invention. In this embodiment, an operating body 7 is formed by a plate made of synthetic resin or wood together with an operating projection 7a. In this case, the operating body 7 can be inserted into a small space, and therefore the construction becomes simpler and the lure plug can be manufactured easily. The rotation of the operating body 7 is restricted by a slot 13 formed in the operating body 7 and a stopper pin 14 passing through the slot 13. As shown in FIG. 3(b) it is preferable that in an outer edge 7b of the operating body 7 there are formed protrusions and recesses.

Figure 4:
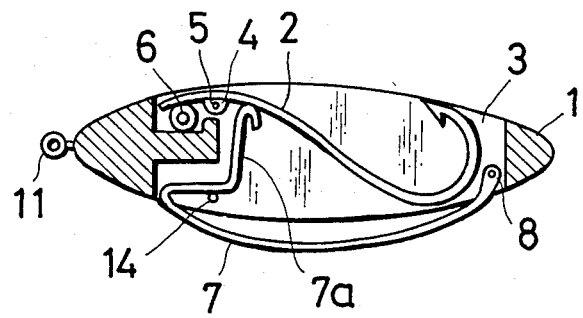

FIG. 4 is a cross sectional view depicting a third embodiment of the lure plug according to the invention. In this embodiment, operating body 7 and operating projection 7a are integrally formed by bending a wire. This lure plug is particularly cheap in cost and a resistance in water can be minimized. Further, the rotation of the operating member 7a, 7b is limited by a pin 14.

Figure 5:
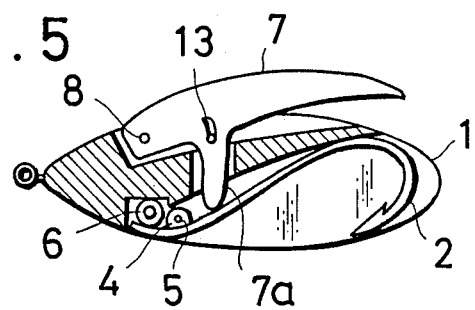
Figure 6:
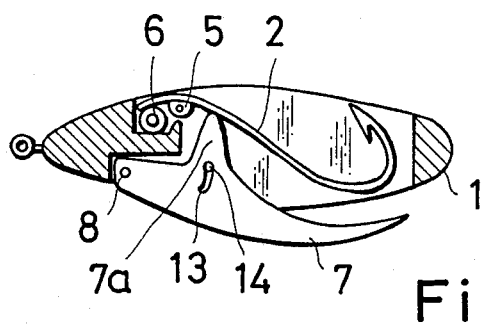
Figure 7:
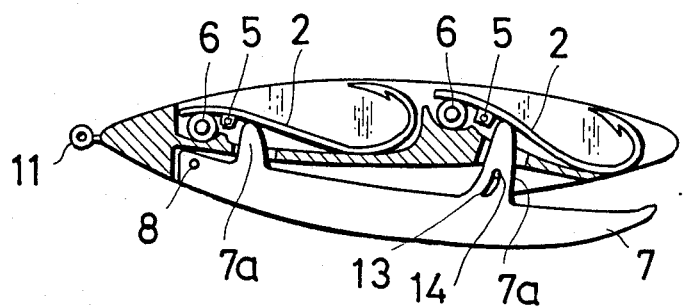

In the embodiments so for explained, the operating member 7, 7a is rotatably supported by the pin 8 at its rear end, but the operating member may be supported at its front end as illustrated in FIGS. 5 to 7. In this case, even if the rear end of the operating member is protruded from the plug body 1 to a great extent, it could hardly be picked up by obstacles. In FIG. 5, the operating member 7, 7a is provided in the upper portion of the plug body 1, and a hook 2 is projected downward. In the embodiment shown in FIG. 6, the positional relation between the hook 2 and operating member 7, 7a is inversed as compared with the embodiment depicted in FIG. 5. In the embodiment illustrated in FIG. 7, two hooks 2, 2 are provided in the plug body 1 and the operating member has an operating body 7 and two operating projections 7a, 7b each engaging with respective hooks 2, 2.

In the embodiments explained hereinbefore, the hook 2 is supported by the shaft 5 near the root portion of the hook, but according to the invention, the hook 2 may be rotatably supported by inserting a shaft 5 through a hook eye 4a formed at the root end of the hook.

Figure 8:
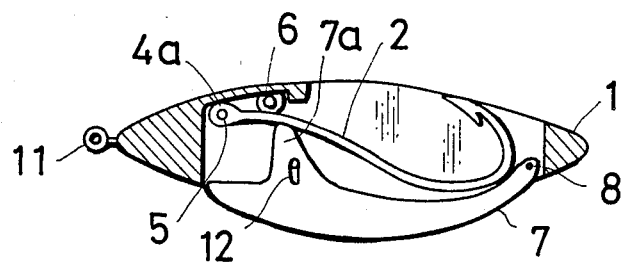
Figure 9:
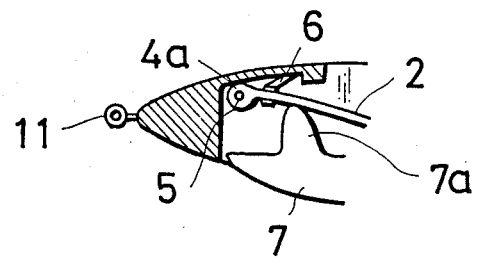

FIGS. 8 and 9 depict still another embodiments of the lure plug according to the invention. In these embodiments, the hook 2 is rotatably supported by the pin 5 passing though a hook eye 4a and the resilient body 6 is provided to be brought into contact with a stem of the hook 2. In the embodiment shown in FIG. 9 a resilient body 6 is formed by lag instead of the resilient tube.

It should be noted that it is not always necessary to support the operating member 7, 7a by means of the pin 8, but the operating member may be formed by a slider which is slidably arranged within the slot 3, a part of the slider being slightly projected out of the plug body 1 by means of the resilient member 6.

The resilient member 6 may be formed by a resilient tube or any suitably shaped mold made of natural rubber, silicon rubber or other synthetic material, or may be formed by a metal leaf spring or a coiled spring. Further, instead of the resilient member 6, use may be made of a permanent magnet arranged near the pin 5.

Figure 10A:
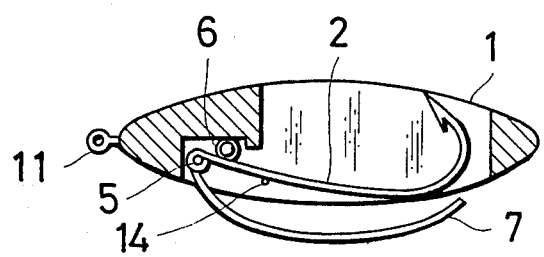
Figure 10B:
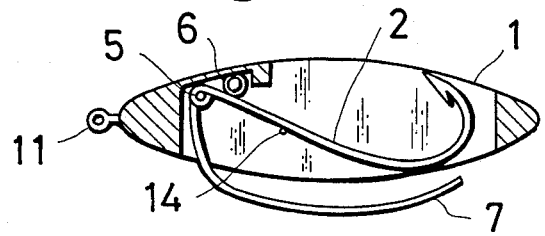

FIGS. 10(a) and 10(b) show another embodiments of the lure plug according to the invention. In these embodiments, the operating member 7 is made of the same material as the hook 2 integrally therewith.

FIGS. 11(a) and 11(b) illustrate still another embodiments of the lure plug according to the invention. In these embodiments, the operating member 7 is formed by an intermediate stem portion of the hook 2. That is to say, the intermediate stem portion of the hook 2 is bent outwardly to such an extent that it projects out of the plug body 1.

FIGS. 12(a), 12(b) and 12(c) show a few embodiments of the holes 4 for rotatably supporting the hook 2. In the embodiment illustrated in FIG. 12(a), a lag 2a is secured to the hook 2 and the hole 4 is formed in the lag 2a. In the embodiment depicted in FIG. 12(b), the root of the hook 2 is secured to a small rod 2a and the hole 4 is formed in the rod 2a. In the embodiment shown in FIG. 12(c), the hole 4 is formed by bending the hook 2 as a loop.

FIGS. 13(a), 13(b) and 13(c) show a few embodiments of the hook 2. FIG. 13(a) illustrates a single hook, FIG. 13(b) a parallel double hook, and FIG. 13(c) a serial double hook. In case of using the parallel double hook 2, the slot 3 for accommodating the hook has a bifurcated tip configuration as shown in FIG. 1.

As explained above, in the lure plug according to the invention, the hook is held within the plug body as long as the fish does not bite the lure plug, so that the lure plug is hardly picked up by obstacles such as waterweeds and rocks. Therefore, the angler using the lure plug according to the invention can effect the casting at better points having many obstacles, so that he can have a chance to get a lot of fishes without loosing the lure plug. Further, since the hook is hidden within the plug body in a normal condition, the angler and other persons near him can be effectively protected against the injury, and the lure plugs are not coupled with other, so that they can be handled easily.

What is claimed is:

1. A lure plug for fishing comprising:
   a. an elongated plug body having a proximal and distal end and a slot formed therein extending in a longitudinal direction between said proximal and distal end;
   b. within said slot, a fish hook having a root end and a barb end having a barb at the terminus thereof, said fish hook being rotatably secured intermediate said root and barb ends to the plug body;
   c. a biasing means supporting surface formed by a supporting platform extending rearwardly from the proximal end of said plug body;
   d. resilient tube means for continuously biasing said root end away from said support surface and said barb end into the plug body to maintain said barb within said slot, said continuous biasing means being supported on said biasing means supporting surface; and,
   e. an operating means movably provided in the plug body such that a portion of the operating means projects out of the plug body, overcomes the bias of the biasing means and pushes the barb out of the plug body when a fish bites the lure plug.

2. The lure plug of claim 1, wherein said resilient tube is made of a natural or synthetic rubber.

3. The lure plug of claim 1, wherein said resilient tube is made of natural rubber.

4. The lure plug of claim 1, wherein said resilient tube is made of silicone rubber.

* * * * *